(12) United States Patent
Pugh et al.

(10) Patent No.: US 7,150,583 B2
(45) Date of Patent: Dec. 19, 2006

(54) ELECTRO KINETIC GEOSYNTHETIC STRUCTURE

(75) Inventors: Robert Colin Pugh, Newcastle Upon Tyne (GB); Colin John Francis Philip Jones, Newcastle Upon Tyne (GB)

(73) Assignee: Newcastle University Ventures Limited, Newcastle Upon Tyne (GB)

( * ) Notice: Subject to any disclaimer, the term of this patent is extended or adjusted under 35 U.S.C. 154(b) by 128 days.

(21) Appl. No.: 10/779,702

(22) Filed: Feb. 18, 2004

(65) Prior Publication Data

US 2004/0162475 A1    Aug. 19, 2004

Related U.S. Application Data

(62) Division of application No. 09/868,623, filed as application No. PCT/GB99/04263 on Dec. 23, 1999, now Pat. No. 6,736,568.

(30) Foreign Application Priority Data

Dec. 23, 1998 (GB) ................................. 9828270.0

(51) Int. Cl.
*B09C 1/02* (2006.01)
*B09C 1/00* (2006.01)
*E02B 11/00* (2006.01)

(52) U.S. Cl. .................. 405/128.7; 405/43; 405/50; 405/128.15; 405/128.45; 205/687

(58) Field of Classification Search ............ 405/128.5, 405/128.15, 128.45, 15, 16, 17, 43, 36, 43.5; 205/687, 758
See application file for complete search history.

(56) References Cited

U.S. PATENT DOCUMENTS

| 4,157,287 A | 6/1979 | Christenson ............... 166/248 |
|---|---|---|
| 4,404,516 A | 9/1983 | Johnson, Jr. ................. 324/54 |
| 4,622,138 A | 11/1986 | Wager ........................ 210/170 |
| 4,678,554 A * | 7/1987 | Oppitz ....................... 204/648 |
| 5,037,240 A | 8/1991 | Sherman ................ 405/128.15 |
| 5,074,986 A | 12/1991 | Probstein et al. |
| 5,240,570 A | 8/1993 | Chang et al. ................ 204/515 |
| 5,476,992 A | 12/1995 | Ho et al. |
| 5,593,248 A | 1/1997 | Kansa et al. |
| 5,656,144 A * | 8/1997 | Hoover et al. ............... 204/515 |
| 5,676,819 A | 10/1997 | Lindgren et al. |
| 5,980,155 A | 11/1999 | Jones et al. |
| 6,089,788 A | 7/2000 | Sandanasamy ............ 405/258.1 |
| 6,210,078 B1 * | 4/2001 | Redwine et al. ............ 405/263 |
| 6,214,189 B1 * | 4/2001 | Won et al. ................... 204/515 |

FOREIGN PATENT DOCUMENTS

DE    0504551    *    1/1992

(Continued)

OTHER PUBLICATIONS

International Geotextile Society (IGS) " Recommended Descriptions of Geosynthetics Functions, Geosynthetics Terminology, Mathematical and Graphical Symbols", 4th edition.

*Primary Examiner*—Katheirne Mitchell
(74) *Attorney, Agent, or Firm*—Jacobson Holman PLLC (57) ABSTRACT

An EKG structure comprising geosynthetic material associated with at least one conducting element wherein the structure comprises at least one core element substantially enclosed by at least one sheath, one or both comprising the geosynthetic material; the use thereof as an electrode, a method for treating substrate with the EKG structure, the treated substance obtained thereby.

6 Claims, 7 Drawing Sheets

FOREIGN PATENT DOCUMENTS

| | | | |
|---|---|---|---|
| DE | 0591963 A1 | | 4/1994 |
| EP | 0 504 551 | | 9/1992 |
| EP | 0 870 875 | | 10/1998 |
| GB | 2 301 311 | | 8/1995 |
| GB | WO 95/21965 | | 8/1995 |
| GB | WO 98/59117 | * | 12/1998 |
| GB | WO9859117 | | 12/1998 |
| GB | WO 00/39405 | * | 7/2000 |
| IT | 0390755 A2 | | 3/1990 |
| JP | 0 224 3816 | | 9/1990 |
| JP | 07 018654 | | 1/1995 |
| JP | 10 110426 | | 4/1998 |
| SG | 0870875 | * | 10/1998 |
| WO | WO 95/21965 | * | 8/1995 |
| WO | WO 00/46450 | * | 8/2000 |

* cited by examiner

ELECTRO KINETIC GEOSYNTHETIC STRUCTURE

This application is a divisional of U.S. patent application Ser. No. 09/868,623 filed on Sep. 25, 2001 now U.S. Pat. No. 6,736,568 which is the national phase under 35 USC §371 of PCT International Application No. PCT/GB99/04263 which has an International Filing Date of Dec. 23, 1999, which designated the United States of America and was published in English and claims priority from 9828270.0 filed Dec. 23,1998, in the United Kingdom, which priority is claimed herein.

The present invention relates to an electrokinetic geosynthetic structure, the use of the electrokinetic geosynthetic structure as an electrode and methods of improving consolidation and reinforcement of substrate and removal or electro-sorption, -adsorption or absorption of contaminates, from substrates or adding materials to substrates under the action of an electric field using an electrokinetic geosynthetic structure.

The use of geosynthetic materials for reinforcement or drainage purposes is established practice. The materials used are generally non-metallic and can take any form, the most common being strips, sheets and grids. They can be manufactured by any suitable method, such as knitting, weaving or needle punching. Geosynthetics, also known as and sometimes referred to as geotextiles, are typically referred to by their principle function for any particular application and since there are essentially five principle functions there are five types of geosynthetics. These are filtration, separation, membrane, drainage and in plane flow, and reinforcement geosynthetics.

Geosynthetics may also provide any combination of the above functions and the present invention can be used for all of these functions, for example in drainage and reinforcement of substrate material in the construction industry, and thus has numerous industrial applications Electrokinetic geosynthetics (hereinafter referred to as EKGs) are electrically conductive geosynthetic or geotextiles. EKGs have an enhanced performance over non-conductive geosynthetics. EKGs, in addition to providing filtration, drainage and reinforcement can be enhanced by electrokinetic techniques for the transport of water and chemicals species within fine grained low permeability substrates, which are otherwise difficult or impossible to deal with. In addition to conductivity, transivity, absorption, wicking, hydrophilic and hydrophobic tendencies may also be incorporated in the geosynthetic.

The ability of electrokinetic phenomena to move water, charged particles and free ions through fine-grained low permeability substrate is established. There are five principle electro kinetic phenomena: streaming potential, migration potential, electro osmosis, ion migration and electrophoresis. The first two of these phenomena are concerned with the generation of electrical potential due to the movement of charges and charged particles respectively. The remaining three are concerned with the transport mechanisms developed upon application of an electrical field across a substrate mass.

In practice, an electrical field is applied across a substrate mass using EKG or conventional electrodes. Cations are attracted to the cathode and anions to the anode. The three transport mechanisms are explained below.

In electro-osmosis, as the ions migrate they carry their hydration water with them and exert a frictional force on the water around them. Hence, there is a flow of water at both the anode and the cathode. In order to maintain a charge neutrality however, there are more cations than anions in the pore fluid of the substrate containing negatively charged particles. Therefore there is a net flow of water to the cathode. This electro osmotic flow depends upon the applied voltage gradient and the electro osmotic permeability of the substrate.

The application of an electrical field across a substrate mass causes migration of the free ions and ion complexes, which are present within the pore fluid, to the appropriate electrode. The average mobility of ions in substrates may be of the order of $5 \times 10^{-8}$ $m^2/Vs$, which is an order of magnitude greater than the electro osmotic permeability. Hence, anions can usually overcome the electro osmotic flow and migrate towards the anode; this movement being known as electro migration or ion migration.

When a DC electric field is applied across a particulate suspension, (colloids, clay particles, organics) charged particles in suspension are electrostatically attracted to one of the electrodes and are repelled from the other. Positively charged particles are attracted to the cathode and negatively charged particles are charged to the anode. Most colloids are negatively charged and are therefore attracted to the cathode. This electrophoresis has found applications in the densification of sludges and mine tailings.

EKGs can take the form of single materials, which are electrically conductive, or composite materials, in which at least one element is electrically conductive, such that the EKG can function as an electrode. They can be of the same basic form as present day filter, drainage, separator and reinforcement materials, but offer sufficient electrical conduction to allow the application of electro kinetic techniques for ground improvement.

There are a number of materials which can be used to produce electrically conductive geosynthetics, such as carbon materials, conductive composites, polymers and metals in the form of fibres, strips, wires, elements, stitching.

GB 2 301 311 relates to improvements in geosynthetics and introduces EKGs. This prior art document discloses EKG structures including layers of drainage and reinforcement geosynthetics stitched together with conductive fibres. The reinforcement and/or drainage material may also be conductive.

Such layered designs, although suitable for many applications, can be limiting in some applications.

There is thus a need for an alternative EKG structure which is easy to manufacture, durable and has a wide variety of applications. This need is satisfied by the present invention.

According to a first aspect of the invention there is therefore provided an EKG structure comprising geosynthetic material associated with at least one conducting element wherein the structure comprises at least one core element substantially enclosed by at least one sheath, one or both comprising the geosynthetic material.

The geosynthetic may be suited as at least one reinforcement and/or drainage/in plane flow and/or filtration and/or separation and/or membrane element.

The sheath serves to protect the structure by increasing its durability and can facilitate transport and manufacture.

Reference herein to a geosynthetic sheath is to any substantially closed or enclosing structure such as a container or tube suited to contain or retain within it one or more core elements and which is suitably at least partially porous, discontinuous or comprises apertures for passage therethrough of charged fluids, particles and the like.

The core element may be of any configuration retained within the geosynthetic sheath. Preferably, the at least one core element is or comprises a continuous, ideally solid, monolithic or divided element. The core may comprise additional elements or components suited to the desired function, such as drainage or in plane flow channels, spacers, voids, reservoirs of or for materials substrate and the like.

The core and sheath may comprise the same or different materials and may both comprise a mixture of materials. In the case where both are formed from substantially the same material, they simply provide an outer portion and solid body portion, portions distinguished by their respective functions.

In an EKG as hereinbefore defined the core element may comprise any functional element required for the EKG, whereby the EKG is suited to be (partially) immersed within the substrate to be treated, or it may comprise or (partially) enclose a substrate to be treated or other material for treating the substrate. For example the core element may provide any or all of the five principle geosynthetic functions, and additionally or alternatively may provide a conducting element and/or sorbing, adsorbing, absorbing or decontaminating element.

Reference herein to substrate is to soil, loam, earth, sod and other ground material including mixed ground material and waste material or a mix of ground material and any other material, sewerage, sludge, or other substance or mixture of substances to be treated.

The at least one conducting element may be provided in any conducting configuration comprised as or associated with the core and/or sheath, suitably chosen according to the desired application. Preferably the conducting element is suited for contact with the substrate or any other material to be treated, directly or indirectly via intermediate conducting medium. More preferably an immersed EKG comprises the conductive element associated with the sheath, more preferably at the outer face of the sheath in direct contact with substrate; or an enclosing EKG comprises the conductive element associated with the sheath or core, more preferably at the inner face of the sheath or within the core in direct contact with substrate or indirect contact via intermediate conducting medium.

An immersed EKG may have proximal and remote regions with respect to the substrate or material to be treated, and preferably comprises the conductive element associated with a proximal region, for example in a planar EKG, associated with a proximal face. Without being limited to this theory it is thought that this improves electrical continuity.

The conducting element comprises a suitable connection for connecting to an electrical supply. The connection may be any connection known in the art for connecting wires or for connecting a wire and conducting shaped electrode. Preferably the connection is insulated to prevent degradation by corrosion due to the presence of water, for example by immersing in resin or enclosing within an insulating box. Preferably a plurality of connections have similar electrical continuity and present similar resistance, ensuring uniform power and minimal potential loss over the electro osmosis system.

In the case where only one core element is present in EKG structure, its position may be any within the geosynthetic sheath but is preferably central.

Any configuration of the sheath and core element may be envisaged which provides a suitable EKG structure. Preferably, the at least one core element or combination of elements including any channels or other functional elements is in direct contact with the sheath over substantially all of its outer surface or their combined outer surface.

Where more than one core element is present, each of these may have a differing or the same functions. For example, neighbouring core elements may have different functions.

Any configuration of the EKG structure as hereinbefore defined may be envisaged. For example the structure could be of any solid shape such as a sphere parallelepiped, tube, or cone.

In one preferred embodiment, the EKG structure is in the form of a large surface area, essentially planar but optionally flexible filled structure hereinafter duvet having two major faces and optionally at least one minor face. Such a shape, when used as an electrode, allows application of an electric field over a large cross-section of substrate.

In another preferred embodiment the EKG structure as hereinbefore defined is in the form of a continuous, elongate tube, tape or rope. Such EKG structures are easy to transport and position within substrate. They may be used in combination, for example in an array or grid. They may thus be used as a plurality of cathodes and/or anodes, or if in contact with each other, in combination as a single cathode and/or anode. Such an array may be, for example, in the form of interwoven EKG structures making up a matrix or cloth.

The conducting element or elements in an EKG structure as hereinbefore defined may be provided in any known conducting material. For example, the conducting element may be pure or composite metallic such as metals or metal powders (steel, copper) dispersed in suitable solid carriers, or conducting non-metallic, such as carbon, a conducting polymer or composite thereof. In an EKG structure as hereinbefore defined the at least one conducting element preferably comprises conducting non-metallic material. Such material is, by definition, less prone to corrosion than metallic material. More preferably, the conducting element comprises conducting non-metallic polymeric material.

Any shape of the conducting element may be provided which creates a conducting EKG structure. For example, the conducting element may be in the form of a filament, fibre, strand, wire, layer of any shape or other solid or hollow form or otherwise, for example, adapted to conform to the structure or environment. Alternatively, conducting material may be dispersed throughout the sheath and/or core as hereinbefore defined to form the at least one conducting element.

Where a plurality of conducting element is provided, these may be positioned in an arrangement within the EKG structure or within a part of the EKG structure. For example the conducting elements may be randomly, regularly or irregularly spaced. In one preferred embodiment the conducting elements are in the form of one or more lines of spaced elongate members and are preferably parallel.

The sheath may be manufactured by any conventional method and may be rendered electrically conductive, for example by heat bonding, gluing, needle punching, extrusion, extraction, casting, moulding, weaving, knitting or any combination of these methods. The chosen method is dependent on the required properties of the sheath.

The material forming the sheath must be either conductive or porous or discontinuous to allow current to pass through it to a conducting element such that the EKG structure as hereinbefore defined can function effectively as an electrode in-situ.

Preferably the material forming the sheath is conductive; this may be achieved in a number of ways. For example, in one preferred embodiment the sheath comprises conductive material and preferably acts as the conducting element.

In another preferred embodiment the sheath comprises a non-conductive material with conducting material running through it at least partially on the outer surface of the sheath. Non-conducting material is suitably any polymeric material known for constructing geosynthetics or filters. The polymer preferably comprises metal deactivator and anti-oxidant to reduce long term degradation of the conducting element. Any known metal deactivator and anti oxidant may be employed.

Where the EKG structure is in the shape of a duvet, the conductive material may be provided on both major faces, one of the faces and/or on the optional minor face, where present. In one preferred embodiment, the conductive material is provided on one major face of the sheath only. In another preferred embodiment, conductive material is provided on both major faces.

The EKG structure may comprise a reinforcing element as hereinbefore defined in any advantageous form and orientation to reinforce the EKG as hereinbefore defined. For example, the at least one reinforcing element may be distributed throughout the EKG, in sheet form, or in the form of one or more elongate elements. In one preferred embodiment, the reinforcing element is at least one high strength elongate element running parallel to the longitudinal axis of the EKG structure.

The EKG structure may comprise an element for introducing, dispersing, sorbing, adsorbing, absorbing or decontaminating materials such as organics, inorganics or a mixture of both, for example activated carbon, inorganic porous materials, such as naturally occurring or synthetic aluminosilicates, for example zeolites, preferably activated zeolites, metal particles, coated metal particles, soil grouting, or lime.

Certain specific constructions of the EKG structure as hereinbefore defined have proved particularly advantageous.

In one preferred construction, the sheath encloses a core of substrate and the conducting element is provided in association with the sheath. In this preferred construction the sheath takes the form of a bag, tube or container. An electrode, which may also be an EKG, is inserted within an opening of the EKG structure.

Electrical potential between the electrode and EKG structure acting as electrode may transport water towards the other electrode and opening, such that it exits the EKG structure through the opening. Preferably, where the sheath is porous, it transports water from the other electrode to the EKG structure and out through the porous sheath. The same structure, with opposite charging, may be used for both methods.

In another preferred construction the EKG structure as hereinbefore defined comprises a conductive sheath enclosing a core layer comprising alternating reinforcing and conducting elements.

In a further preferred construction the EKG structure as hereinbefore defined comprises a conductive sheath enclosing a lime-pile core, the sheath serving to enhance migration of calcium ions from the pile, which are then able to move further and more rapidly into the soil.

In a further preferred construction the EKG structure as hereinbefore defined comprises a conductive sheath enclosing a soil grouting core to form a soil nail, the sheath serving to enhance fixation of the soil nail in the soil.

In a further preferred construction, the EKG structure as hereinbefore defined comprises a duvet having conductive material on one or both major face thereof and enclosing a zeolite or activated carbon. In use, where one major face is conductive, the EKG structure is positioned with the conductive major face adjacent to the mass of substrate to be treated. Where both major faces are conductive, the EKG structure is adapted to treat soil mass on both sides.

In a further aspect of the invention there is provided the use of the EKG structure as hereinbefore defined as an electrode. In a preferred embodiment the EKG structure as hereinbefore defined is adapted to be used as both a cathode and an anode. This allows reversal of the electrical field in situ.

In a further aspect of the invention there is provided a method of treating a substrate by improving its consolidation and/or reinforcement and/or removing or electro absorbing contaminants from it comprising positioning a plurality of electrodes, at least one of which is an EKG structure as hereinbefore defined in situ and applying an electric field between the electrodes.

The EKG may be installed by any known technique into a surrounding substrate, for example by lancing the substrate or by rotary drilling or auger. The EKG may be installed directly into surrounding substrate or may be installed into a contact material which is installed or injected within the substrate. A suitable contact material is any material providing good electrical conductivity, for example any backfill such as clay, bentonite slurry and the like. The substrate may expand or contract during or after installation which may improve or reduce electrical contact and contact material may be injected accordingly as desired.

The nature and configuration of EKG may be selected according to the desired application and the nature of substrate to be treated. In instances in which it is desired to reverse polarity during the treatment process suitable configuration requires an external conducting element in direct contact with soil which maintains longitudinal hydraulic conductivity, for example using an internal drainage composite with porosity and pore size of the band drain filter suitable for draining surrounding substrates.

In a further aspect of the invention there is provided a method of treating a substrate by adding a nutrient or other biological or non-biological material, changing the pH or heating comprising providing a source of the material, whether as part of the EKG structure or otherwise, positioning a plurality of electrodes, at least one of which is an EKG structure as hereinbefore defined in situ and applying an electric field between the electrodes.

An electric field for use with the EKG, electrode or in the methods of the invention may be uniform, stepped or otherwise profiled with time or throughout the electrode or EKG. Preferably the field is uniform throughout the structure and varies with time, for example is stepped up from an initial threshold field.

The methods may be used with any number of electrodes. Where more than two electrodes are provided, individual electrodes may be connected to electrical supplies and the electrical potential applied across each anode/cathode pair. Such connection is known as mono polar connection. One disadvantage of mono polar connection is the necessity for high current, low voltage supplies that are relatively expensive.

Alternatively and preferably, the outer two electrodes of an array of electrodes may be connected to an electrical supply. In this way the intermediate electrodes act as induced electrodes and the voltage distributes itself between the outer electrode pair. This is known as bi polar connection and simplifies electrical connection as well as requiring a lower current and higher voltage than mono-polar connections. The reduced current requirements will lead to lower current densities, which are desirable for efficient electro osmosis.

In a further aspect of the invention there is provided a treated substrate obtained by transformation of a core element or environment, with use of an EKG or method as hereinbefore defined.

Embodiments of the invention will now be described by way of example only with reference to FIGS. 1 to 20.

FIG. 4b is a diagram showing an alternative arrangement of conductive elements on the sheet of FIG. 4a.

Figure 1:
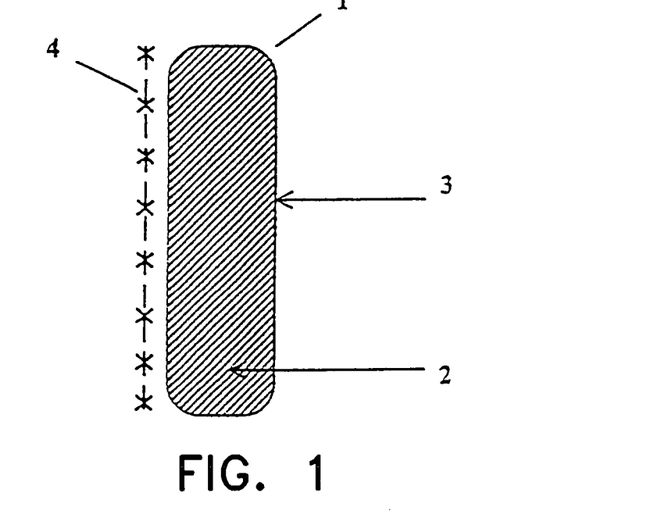
FIG. 1 is a cross-section through an EKG duvet structure.

The EKG structure (1) of FIG. 1 is in the form of a duvet having a core (2) of activated carbon or other material, such as zeolite, substantially enclosed within a sheath (3) of geosynthetic material. A conducting element (4) is provided on one major face of the duvet in the form of a sheet, grid, strip, cable, wire or tape.

Figure 2:
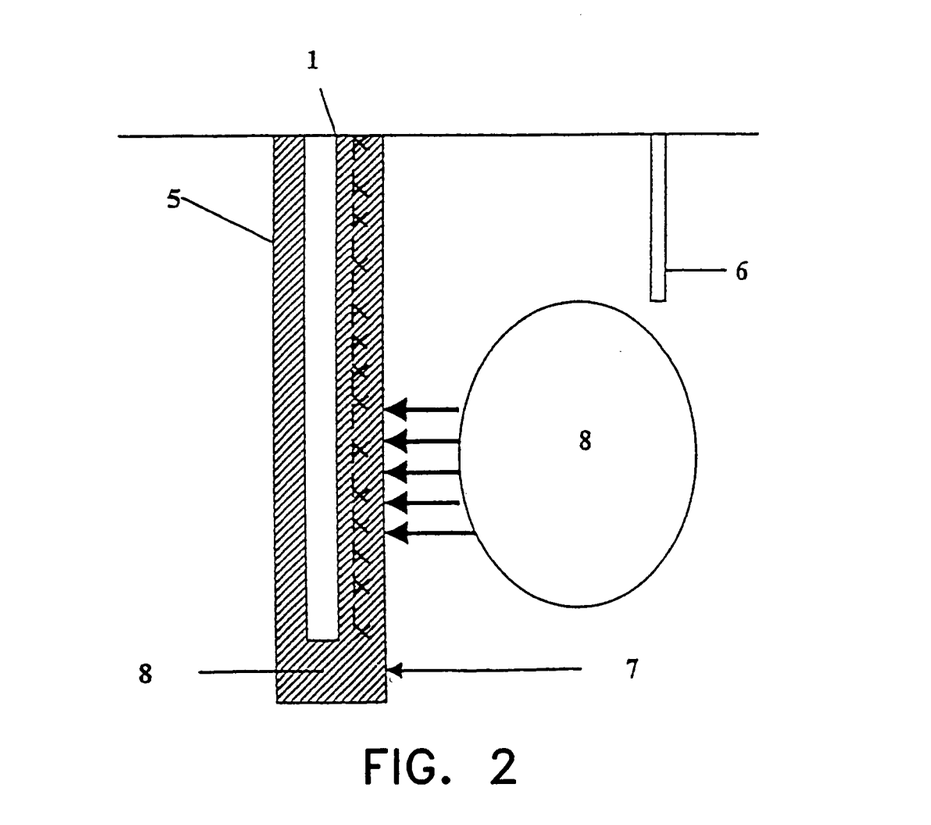
FIG. 2 is a vertical cross-section showing the EKG duvet structure of FIG. 1 in situ.

In FIG. 2 the EKG structure is shown in situ acting as a cathode (5). Anode (6) may be another EKG or a conventional metal electrode. EKG structure (1) has been inserted into excavation (7) that is filled with an electrolyte (8) such as bentonite. Contaminant (8) flows or is transported towards the cathode passing through the activated carbon and being trapped. Once the activated carbon has been fully mobilised, the cathode can be removed and replaced. This process is assisted by the loose fit of the EKG structure (1) in excavation (7) which is made possible due to the presence of electrolyte (8) which allows electrical contact between the EKG structure and substrate.

Figure 3:
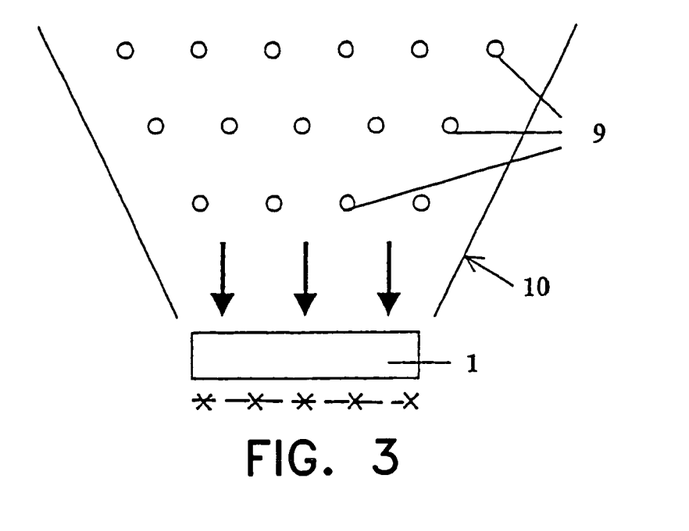
FIG. 3 is a horizontal cross-section showing an arrangement of an EKG duvet structure shown FIG. 1 in gate form and other electrodes in situ.

FIG. 3 shows the concentration of contaminant towards EKG structure (1) by use of a plurality of electrodes (9) and impervious membranes (10) which converge towards the EKG structure (1) in the form of an EKG gate.

Figure 4A:
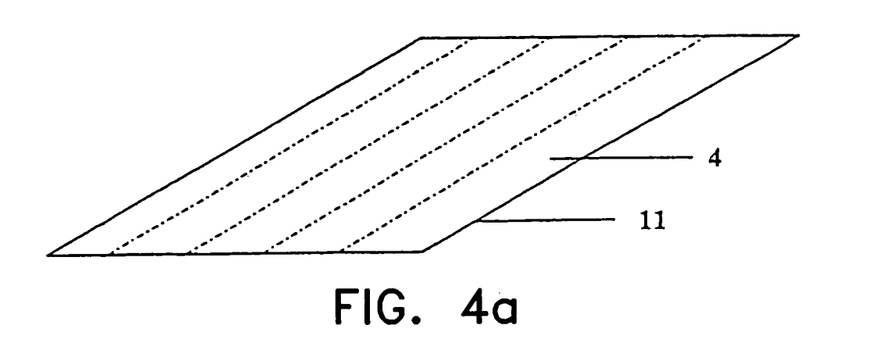
FIG. 4a is a diagram of an EKG sheet component showing the arrangement of conductive elements forming part of the EKG structure shown in FIG. 1.
Figure 4B:
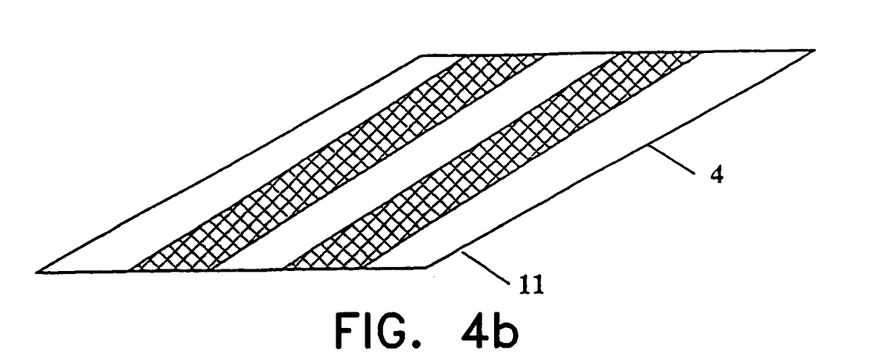

FIGS. 4a and 4b show suitable arrangements of conductive elements on or in a sheet of EKG material used to create the duvet. In FIG. 4a the conducting elements are regularly spaced strands on the surface of the material. In FIG. 4b the conducting elements are bands of material which may, as well as being conducting, have other functions, such as drainage.

Figure 5:
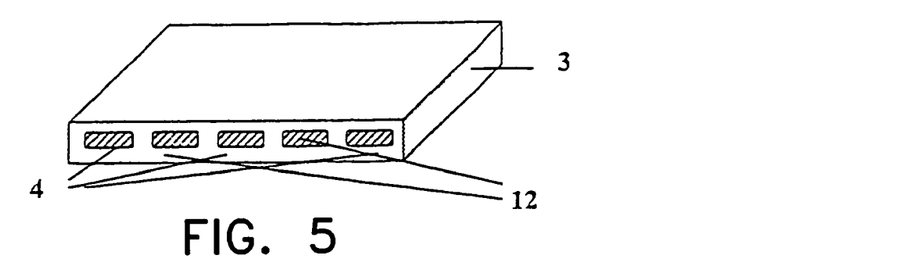
FIG. 5 is a view of an EKG structure in the form of tape.

FIG. 5 shows an EKG tape with a conductive sheath (3) enclosing a row of five cores in which reinforcing elements (12) alternate with conductive elements (4).

Figure 6:
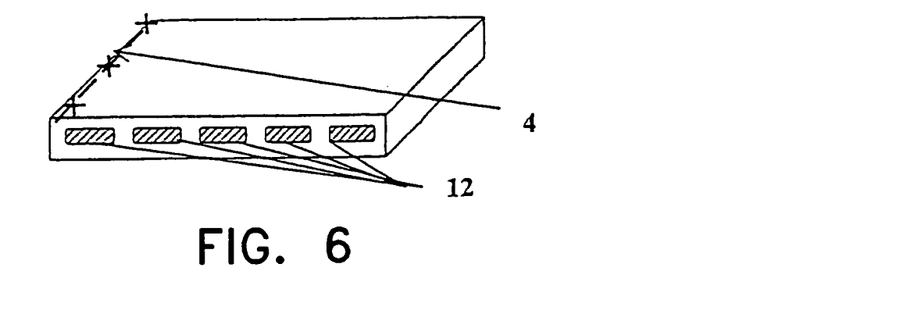
FIG. 6 is a view of another EKG structure in the form of a tape.

In FIG. 6 conducting element (4) is present on the surface of the sheath and five reinforcing cores (2) are provided.

Figure 7:
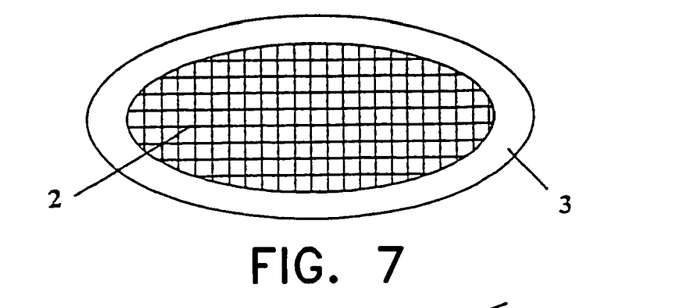
FIG. 7 is a diagram showing an EKG structure in the form of a tube.

FIG. 7 shows a simple EKG structure with a conducting geosynthetic core (2) and sheath (3).

Figure 8:
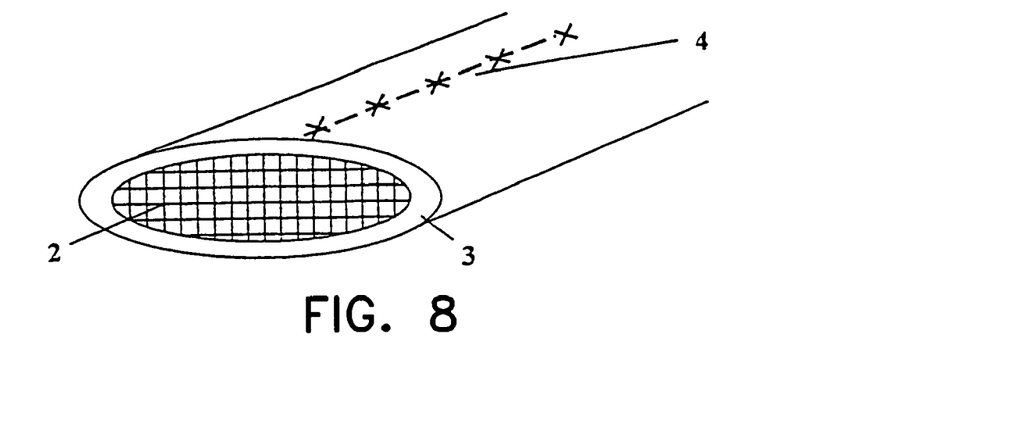
FIG. 8 is a diagram showing an alternative construction of a tube EKG.

FIG. 8 is similar to FIG. 7. In this case, the sheath is conductive due to a conducting element.

Figure 9:
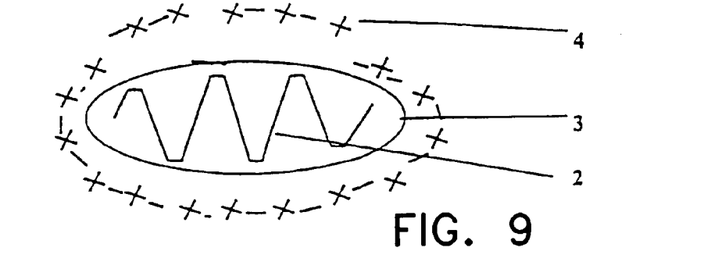
FIG. 9 is a diagram showing a further alternative EKG tube.

The EKG tube of FIG. 9 has a geosynthetic core (2) and a sheath comprising a drainage composite (3) having an electroconducting geosynthetic element on its outer face.

Figure 9A:
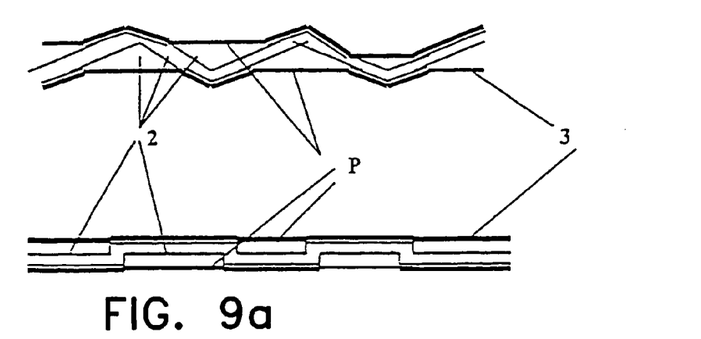
FIG. 9a shows an EKG comprising longitudinal hollow channels for in plane flow of a core of fluid.

FIG. 9a shows a sheath which is porous or is porous in sections P, about a reinforcing core of geosynthetic (12), enclosing channels for drainage or in-plane flow, transport of fluid. The geosynthetic may be in any configuration creating void channels, as shown.

Figure 10:
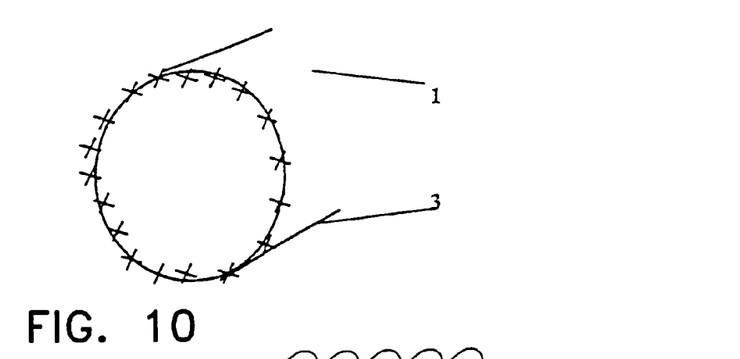
FIG. 10 shows a hollow EKG tube for incorporation of a core of substrate material.

FIG. 10 shows a sheath formed of geosynthetic material. Filling the sheath with substrate, lime or other material will form an EKG structure.

Figure 11:
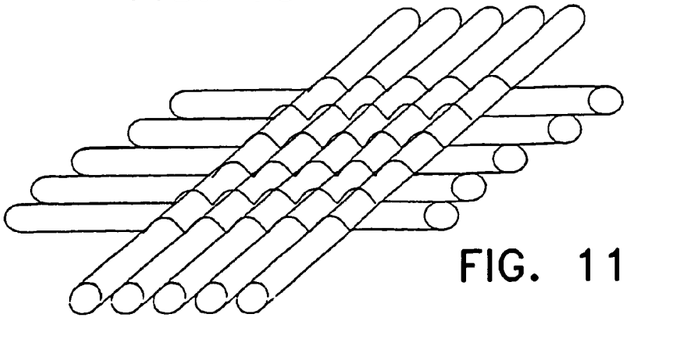
FIG. 11 is a diagram showing a woven EKG arrangement.

FIG. 11 illustrates a woven EKG arrangement formed from any of the EKG tapes and ropes as shown in FIGS. 5 to 9.

Figure 12:
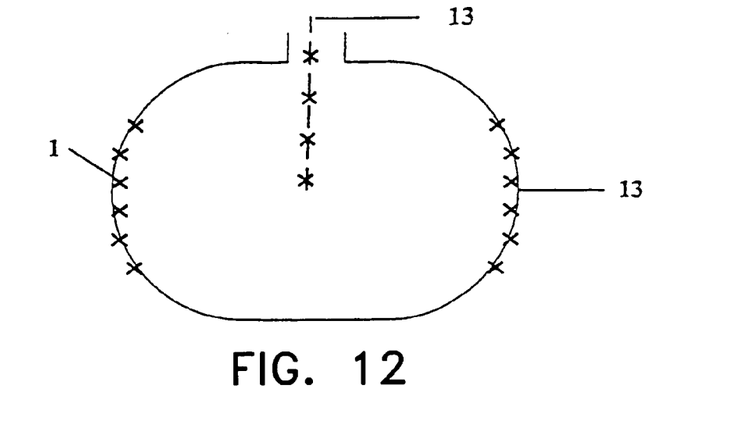
FIG. 12 is a diagram showing an EKG geo tube.

The conventional geo tube shown in FIG. 12 shows an EKG geo tube which may be used to construct dikes. Fill is held within a porous tube (11) such as a porous geosynthetic sheath to allow liquid drainage from it.

Figure 13:
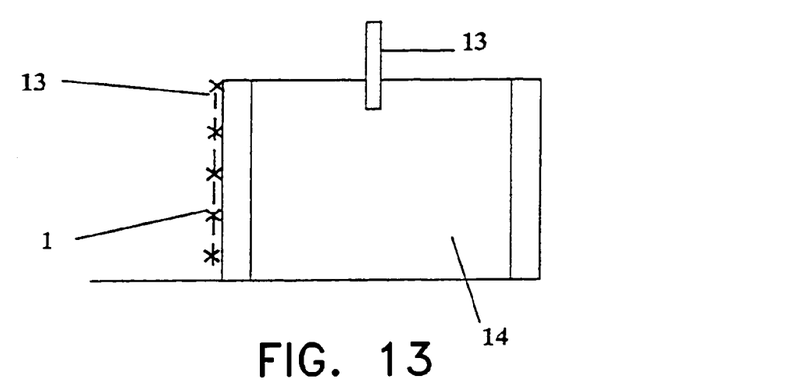
FIG. 13 is a diagram showing an EKG geo container.

FIG. 13 shows an EKG geo container. Both of these can be used to reduce liquid content much faster than a non-conducting tube or container. A field between electrodes (13), one inserted in the opening and one comprised in sheath (11), transports liquid out of the container or geo tube through the porous sheath. The fill (14) may be, for example, silt or clay or substrate.

Figure 14:
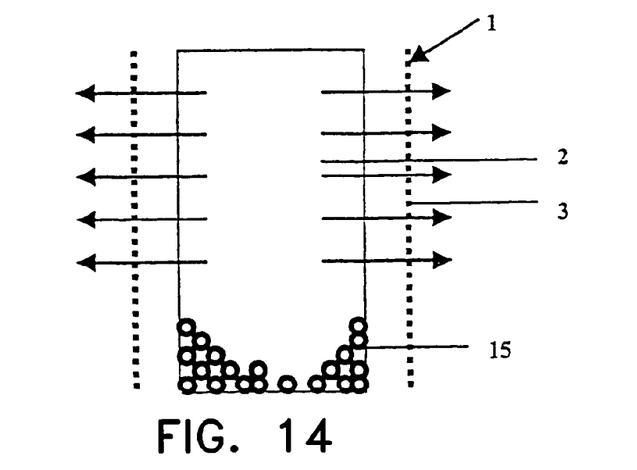
FIG. 14 is a cross-section through a lime pile core within an EKG sheath

FIG. 14 shows the use of the EKG structure with lime piles or soil nails. A lime pile (15) is a hole in the ground filled with lime. Lime piles have been used for slope stabilisation and improvement of soft substrates for foundations.

One of the stabilising mechanisms of lime piles is the reaction of lime and the surrounding substrate. The reaction relies on the migration of the lime from the pile. In most substrates this does not influence more than about a 30 mm angular zone around the pile.

Another stabilising mechanism is the strength of the pile itself. In the short term, the realisation of this strength relies on lateral consignment; in the long term this strength is achieved through crystallisation of the lime in the pile.

The performance of lime piles and soil nails is improved using electro osmosis and the EKG structure of the invention, with subsequent carbonisation in the case of lime piles.

The pile or soil grouting (15) forms the core (2) of the EKG structure and a conductive EKG sheath (3) encloses the lime pile. Surrounding the pile with EKG allows electro osmosis to be introduced therefore potentially inducing the calcium ion movement (16) in the pile to move further and more rapidly into the substrate. Polarity may be subsequently reversed for redistribution purposes. The EKG also provides lateral confinement. Thus its use improves the short-term strength of the pile and increases the size of the stabilised zone.

Carbonisation increases the effectiveness of the crystallisation in terms of speed and overall strength. It has a potential to improve the strength of the stabilised zone in addition to the pile.

Figure 15:
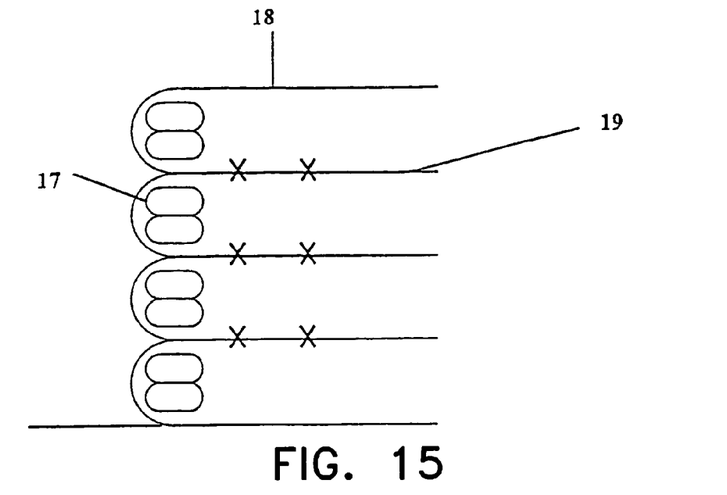
FIG. 15 is an EKG construction for reinforcement.

FIG. 15 shows a concertina construction of reinforced soil using sandbags (17) grouped vertically by a reinforcing member (18) comprising stabilising tape, grid or sheet, with the use of EKG elements as the reinforcing member (19). In this EKG concertina construction, each layer of EKG can act as both anode and cathode. Each layer is activated in turn as construction proceeds to drain liquid from the reinforcing construction. The EKG elements may alternatively be separate from reinforcing members, in similar fashion to that illustrated in FIG. 17.

Figure 16:
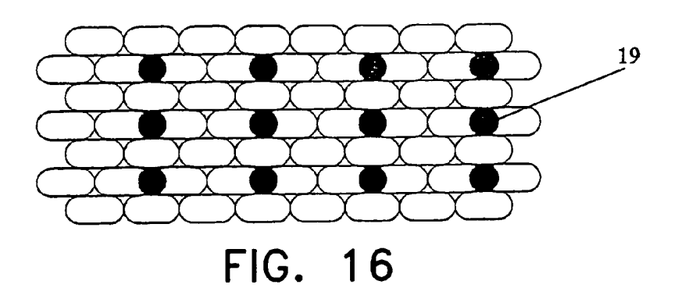
FIG. 16 is a front elevation of the EKG construction for reinforcement shown in FIG. 15.

FIG. 16 is a front elevation of the EKG concertina construction showing positioning of the EKGs.

Figure 17:
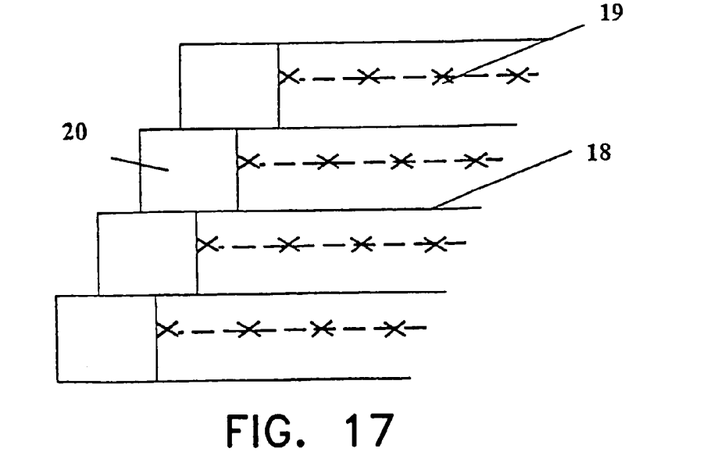
FIG. 17 is an alternative EKG construction for reinforcement.

FIG. 17 shows an alternative reinforcement construction using gabions (20) and EKG members (19) separate from conventional reinforcing members (18).

Figure 18:
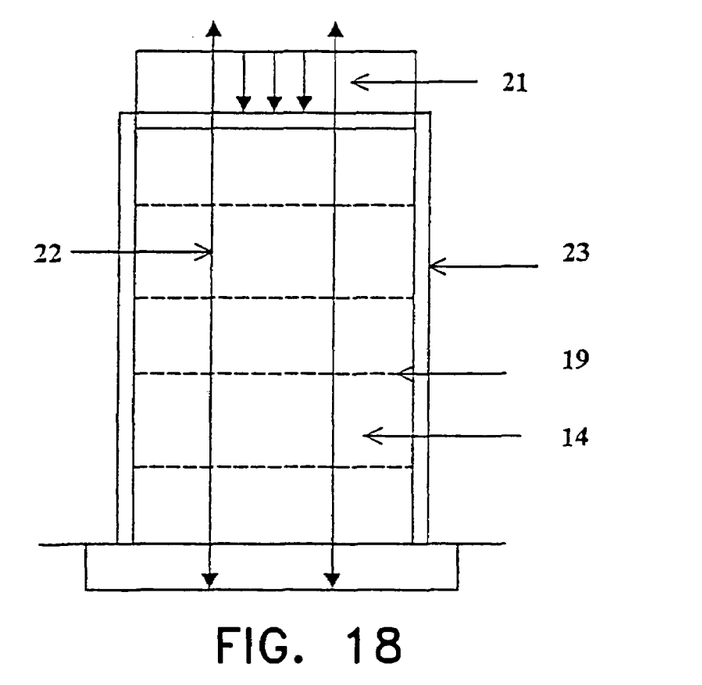
FIG. 18 is a diagram of a conventional pre-stressing structure.

The conventional substrate prestressing cell shown in FIG. 18 shows substrate (14) being compressed between reaction plates (21) using pre-stressing cables or bars (22). The substrate (14) is held within a container (23) which also holds horizontal and vertical reinforcement members (19). The structure is constructed in layers from the bottom upwards and can be used, for example, as a sub-structure for bridges. When the substrate is compressed, liquid held in the substrate exits at the top of the container to either side of reaction plate (21).

Figure 19:
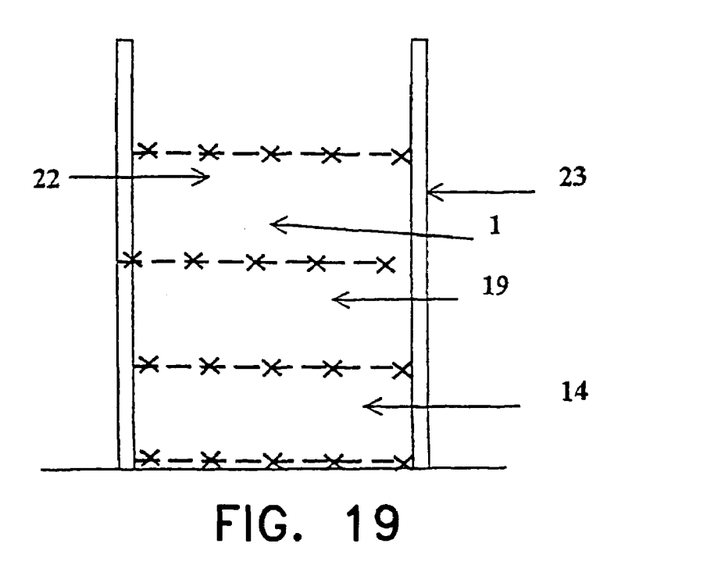
FIG. 19 is a diagram of an alternative EKG substrate structure.

FIG. 19 shows an alternative substrate cell using an EKG structure (1) as reinforcement. This allows movement of fluid from the substrate resulting in stiffening and strengthening of the substrate fill. Thus no reaction plates or pre-stressing cables or bars are required since osmotic pressure replaces the mechanical pre-stressing pressure.

EXAMPLE 1

EKG for Use as a Drain

The EKG of FIG. 9 was tested with London clay, PFA, mixtures of PFA and London Clay, salt solution and in bentonite slurry wall waste.

The design was found to give excellent electrical contact between the soil and the EKG electrode which gave efficient and cost effective electro osmosis.

In order to ensure that the electrodes remain open, acting as a drain, a filter element was inserted into the electrode. In one case the filter surrounds the EKG and an increased resistance was observed between the soil and the EKG which was minimised by maintaining the filter in saturated state such that a continuity of ions exists through the soil/EKG structure. For use as anode (+) the structure having EKG surrounding the filter was used since it is not feasible to keep the filter at the anode saturated as this causes water to be forced into the soil by electro osmosis causing swelling and the loss of strength of the soil. The structure having EKG at the outer face was found to give optimal performance in terms of conductivity and transport.

A number of materials were tested for suitability as illustrated in Table 1 and the results in terms of durability were observed.

TABLE 1

| Core Metal | Polymer Coating |
|---|---|
| Copper | Standard CABOT CABLEC 3892 |
| Copper | Standard CABOT CABLEC 3892 & Ciba IRGANOX MD 1024 |
| Stainless Steel | Standard CABOT CABLEC 3892 |
| Stainless Steel | Standard CABOT CABLEC 3892 & Ciba IRGANOX MD 1024 |

For long term use it was found that a standard conductive polymer and copper wire sheath underwent degradation at the anode both above and below the entry point into the soil, although the cathode was unaffected. Addition of a metal deactivator and anti-oxidant into the polymer compound used for the sheath reduced or totally overcame this effect.

This example was carried out by passing high currents through each of the EKG anode (+) types arranged in a circular pattern around a central steel cathode (−) in a high water content slurry of grade E kaolin. The degradation of electrodes could be seen by discoloration of the kaolin. It was found that the least degradation occurred with the stainless steel core EKG with standard Cabot Cablec 3892 and Ciba Irganox MD 1024 polymer coating.

EXAMPLE 2

Installation of EKG

The EKG of Example 1 was installed into the ground for use as an electro osmotic band drain by each of the following methods:
Lance;
Rotary drilling/auger The EKG electrode installed by lance, like a conventional band drain gives little overbore and the soil is thought to expand laterally onto the EKG and produce good electrical conductivity, using the external conducting element configuration.

The EKG electrode installed by drilling/auger is thought to give a little overbore, bentonite slurry is placed in the hole and the EKG is pushed into the slurry, and this ensures good electrical contact between the EKG and the surrounding soil.

The EKG connector for connecting the EKG to a power source is preferably water proof, for example by potting the connection with epoxy resin or within a plastic connection box as necessary.

Further advantages of the invention will be apparent from the foregoing.

Reference Numerals

1. EKG Structure.
2. Core.
3. Sheath
4. Conducting Element.
5. Cathode.
6. Anode.
7. Excavation.
8. Electrolyte.
9. Electrode (EKG or non EKG).
10. Impervious Membrane.
11. Geosynthetic Sheath.
12. Reinforcing Element.
13. Electrode.
14. Fill/Substrate.

15. Lime Pile.
16. Ion Movement.
17. Sandbags.
18. Non-conducting Reinforcing Member.
19. EKG Reinforcing Member.
20. Gabion.
21. Reaction Plate.
22. Pre-Stressing Cables/Bars.
23. Container.

The invention claimed is:

1. An electrokinetic geosynthetic ("EKG") structure for direct contact with substrates of ground materials, said EKG structure comprising a porous geosynthetic sheath in the form of a bag, tube, or container substantially enclosing, surrounding and contacting an outer peripheral surface of a core of substrate to be treated, wherein said sheath comprises geosynthetic material including at least one electrically conducting element comprising a first electrode on said sheath so as to be in direct contact with said core of substrate and to provide a conductive path with said substrate, and at least one second electrode extending into the core through an opening in the sheath and laterally spaced from the sheath.

2. An EKG structure in accordance with claim 1 wherein said electrically conducting element is composite metallic, comprising metal or metal powder dispersed in a solid carrier, or is conducting non-metallic.

3. An EKG structure in accordance with claim 1 wherein said electrically conducting element is in the form of a filament, fibre, strand, wire, layer of shaped solid or hollow form, in close association with the sheath.

4. An EKG structure in accordance with claim 1 wherein said electrically conducting element is comprised as electrically conducting material dispersed throughout the sheath such that the sheath itself forms the electrically conducting element.

5. Method of treating a substrate by improving its consolidation comprising enclosing said substrate to be treated within an EKG structure as defined in claim 1 and applying an electric field between the first and second electrodes.

6. Method of draining a substrate by enclosing said substrate within the EKG structure as described in claim 1 and applying an electric field between the first and second electrodes.

* * * * *